(12) United States Patent
Ptasienski et al.

(10) Patent No.: US 7,518,090 B2
(45) Date of Patent: Apr. 14, 2009

(54) TAILORED HEAT TRANSFER LAYERED HEATER SYSTEM

(75) Inventors: Kevin Ptasienski, O'Fallon, MO (US);
James McMillin, Algonquin, IL (US);
Louis P. Steinhauser, St. Louis, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 203 days.

(21) Appl. No.: 11/517,401

(22) Filed: Sep. 7, 2006

(65) Prior Publication Data

US 2007/0000913 A1 Jan. 4, 2007

Related U.S. Application Data

(62) Division of application No. 10/752,358, filed on Jan. 6, 2004, now Pat. No. 7,342,206.

(51) Int. Cl.
*H05B 3/58* (2006.01)
*H05B 3/00* (2006.01)
*H01C 1/12* (2006.01)

(52) U.S. Cl. .................... 219/535; 29/611; 338/314

(58) Field of Classification Search ................ 219/212, 219/444.1, 535, 538, 543, 549, 552, 219, 219/424, 542, 544; 29/611, 620; 338/49, 338/314
See application file for complete search history.

(56) References Cited

U.S. PATENT DOCUMENTS 5,606,484 A * 2/1997 Kawada et al. .............. 361/234
5,973,296 A * 10/1999 Juliano et al. ............... 219/424
6,164,954 A * 12/2000 Mortazavi et al. ........... 425/549
6,222,166 B1 4/2001 Lin et al.
6,575,729 B2 6/2003 Godwin et al.
6,717,118 B2 4/2004 Pilavdzic et al.
6,762,396 B2 7/2004 Abbott et al.
2003/0003188 A1 1/2003 Gunther
2003/0218006 A1 11/2003 Sutorius
2004/0037913 A1 2/2004 Gellert et al.
2004/0071814 A1 4/2004 Babin et al.
2004/0166194 A1 8/2004 Trudeau
2004/0256382 A1 12/2004 Pilavdzic et al.
2005/0181090 A1 8/2005 Olaru
2006/0003041 A1 1/2006 Rosner

FOREIGN PATENT DOCUMENTS

DE 199 36 584 A1 2/2001

\* cited by examiner

*Primary Examiner*—Daniel L Robinson
(74) *Attorney, Agent, or Firm*—Brinks Hofer Gilson & Lione

(57) ABSTRACT

Methods of assembling a high heat transfer and tailored heat transfer layered heater systems are provided. One method includes a step of pressing one of a target part and a layered heater into the other one of the target part and the layered heater to create an interference fit between the layered heater and the target part. When the target part is disposed within the layered heater, the layered heater includes a substrate defining an inner periphery less than or equal to an outer periphery of the target part. When the layered heater is disposed within the target part, the layered heater includes a substrate defining an outer periphery larger than or equal to an inner periphery of the target.

14 Claims, 14 Drawing Sheets

DETAIL B

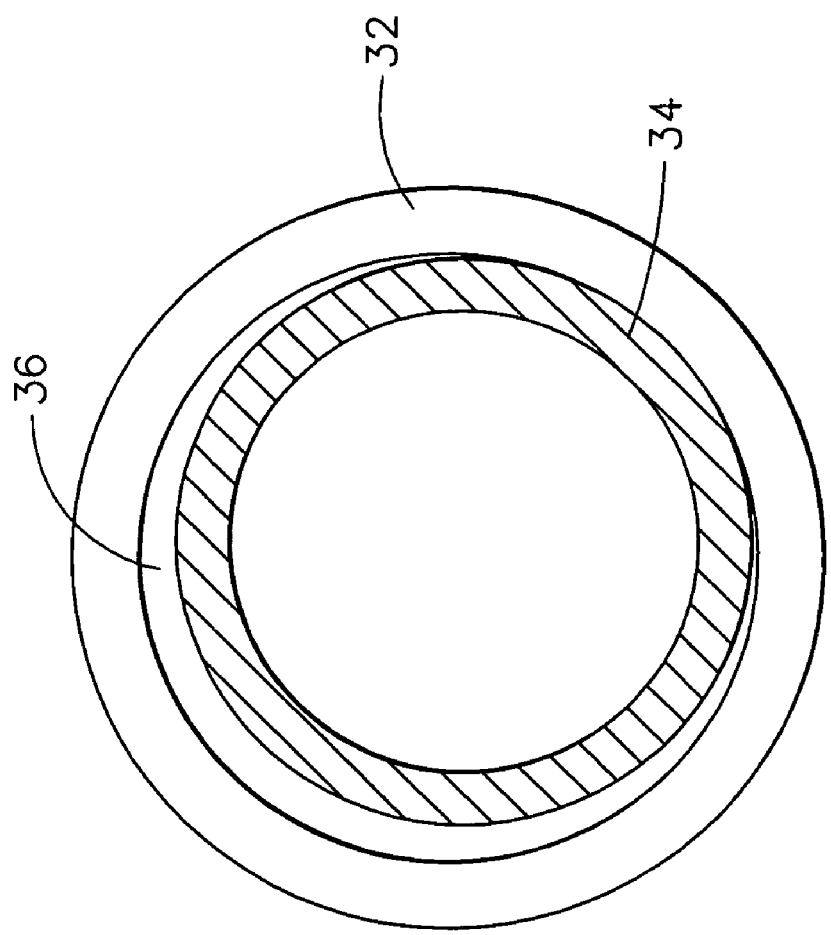

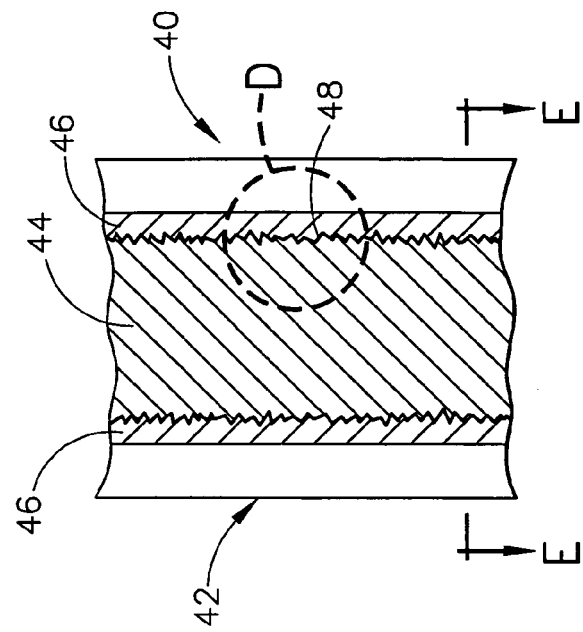
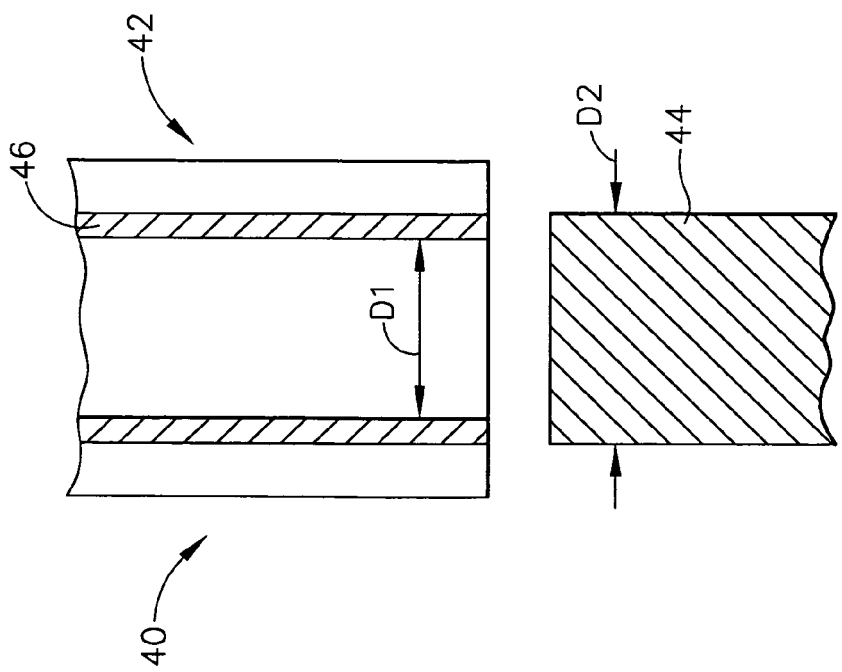
FIG. 3b
FIG. 3a

DETAIL D

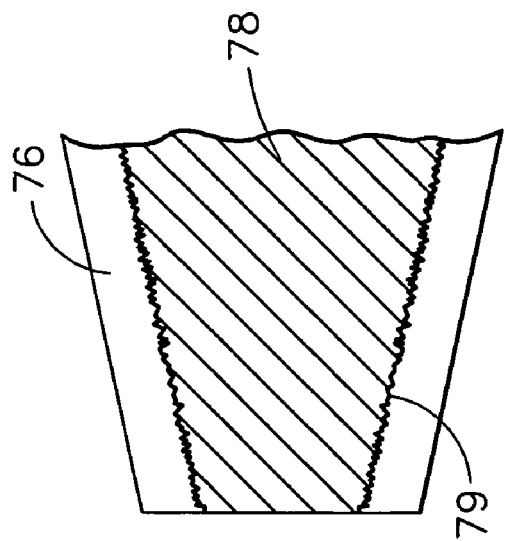
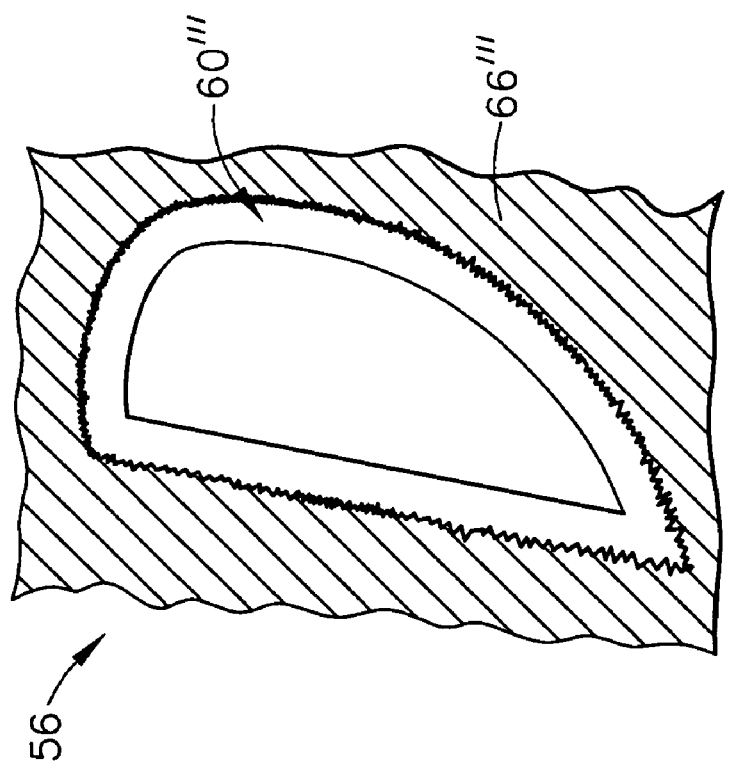
FIG. 9
FIG. 8

TAILORED HEAT TRANSFER LAYERED HEATER SYSTEM

CROSS-REFERENCE TO RELATED APPLICATION

The present application is a divisional of application Ser. No. 10/752,358, titled "Tailored Heat Transfer Layered Heater System" filed Jan. 6, 2004. The disclosure of the above application is incorporated herein by reference.

FIELD

The present disclosure relates generally to electrical heaters and more particularly to methods of controlling the heat transfer of electrical heaters.

BACKGROUND

The statements in this section merely provide background information related to the present disclosure and may not constitute prior art.

Layered heaters are typically used in applications where space is limited, when heat output needs vary across a surface, where rapid thermal response is desirous, or in ultra-clean applications where moisture or other contaminants can migrate into conventional heaters. A layered heater generally comprises layers of different materials, namely, a dielectric and a resistive material, which are applied to a substrate. The dielectric material is applied first to the substrate and provides electrical isolation between the substrate and the electrically-live resistive material and also reduces current leakage to ground during operation. The resistive material is applied to the dielectric material in a predetermined pattern and provides a resistive heater circuit. The layered heater also includes leads that connect the resistive heater circuit to an electrical power source, which is typically cycled by a temperature controller. The lead-to-resistive circuit interface is also typically protected both mechanically and electrically from extraneous contact by providing strain relief and electrical isolation through a protective layer. Accordingly, layered heaters are highly customizable for a variety of heating applications.

Layered heaters may be "thick" film, "thin" film, or "thermally sprayed," among others, wherein the primary difference between these types of layered heaters is the method in which the layers are formed. For example, the layers for thick film heaters are typically formed using processes such as screen printing, decal application, or film dispensing heads, among others. The layers for thin film heaters are typically formed using deposition processes such as ion plating, sputtering, chemical vapor deposition (CVD), and physical vapor deposition (PVD), among others. Yet another series of processes distinct from thin and thick film techniques are those known as thermal spraying processes, which may include by way of example flame spraying, plasma spraying, wire arc spraying, and HVOF (High Velocity Oxygen Fuel), among others.

In layered heater applications where the substrate is disposed around or within the part or device to be heated, such as that disclosed in U.S. Pat. No. 5,973,296, which is commonly assigned with the present application and the contents of which are incorporated herein by reference in their entirety, intimate contact between the substrate and the part to be heated is highly desirable in order to improve heat transfer between the layered heater and the part and thus overall heater response. In known layered heaters, however, at least some small air gap is present between the substrate and the part due to inherent fit tolerances, which negatively impacts heat transfer and the response of the layered heater. Other known heaters employ another material on assembly of the substrate to the part, for example, a compound in the form of a thermal transfer paste that is applied between the substrate and the part. During initial operation, however, this compound often produces smoke that could contaminate the heater and/or the surrounding environment. Additionally, application of the compound is time consuming and may also result in some remaining air gaps.

In addition to improved heat transfer as described above, it is often desirable to vary the temperature profile or wattage distribution of electric heaters for certain applications. One known approach to obtain a variable wattage distribution is to vary the width and/or spacing of a resistive circuit pattern within an electric heater. The pattern may be a constant width trace with closer spacing in areas where more heat is desired and wider spacing in areas where less heat is desired. Additionally, the width of the trace may be varied in order to achieve the desired wattage distributions. However, these forms of tailoring the temperature profile or wattage distribution of electric heaters also suffer from reduced, unpredictable, and unrepeatable heat transfer characteristics when undesirable air gaps are present between the heater and the part.

SUMMARY

In one form, a method of the present disclosure comprises assembling a target part and a layered heater to create an interference fit using mechanical processes such as a press or a drive process, and thermal processes such as direct welding or heating/cooling of the target part and/or the substrate of the layered heater system. Further, methods of assembling heater systems in order to provide a high heat transfer fit or a tailored heat transfer interface between a layered heater and a target part are provided according to the teachings of the present disclosure.

For example, a method of forming a layered heater is provided that comprises forming a dielectric layer, forming a plurality of insulative pads on the dielectric layer, and forming a resistive layer over the insulative pads and the dielectric layer. Such a method results in a heater system having a tailored heat transfer fit. Additionally, another method employs a pre-coat, which is in one form a brazing compound, applied to either a target part and/or a layered heater in order to provide a high heat transfer fit between the target part and the layered heater.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

DRAWINGS

The present disclosure will become more fully understood from the detailed description and the accompanying drawings, wherein:

FIG. 2c is a cross-sectional view, taken along line C-C of FIG. 2b, illustrating a non-concentric fit between a layered heater and a target part according to a prior art heater system;

FIG. 3a is a side cross-sectional view of a layered heater and a target part constructed in accordance with the principles of the present disclosure;

FIG. 3b is a side cross-sectional view of a layered heater disposed around a target part in accordance with the principles of the present disclosure;

FIG. 8 is a side cross-sectional view of a splined layered heater disposed within a splined target part in accordance with the principles of the present disclosure;

FIG. 9 is a side cross-sectional view of a layered heater and a target part having a tapered configuration in accordance with the principles of the present disclosure;

Figure 13:
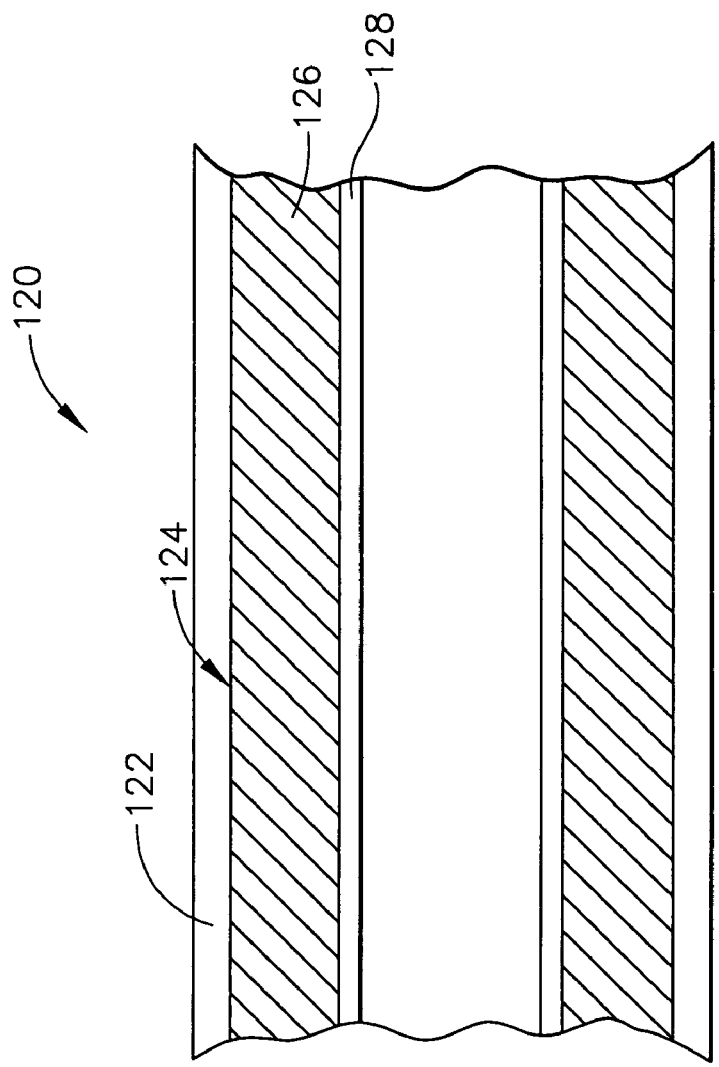
Figure 14:
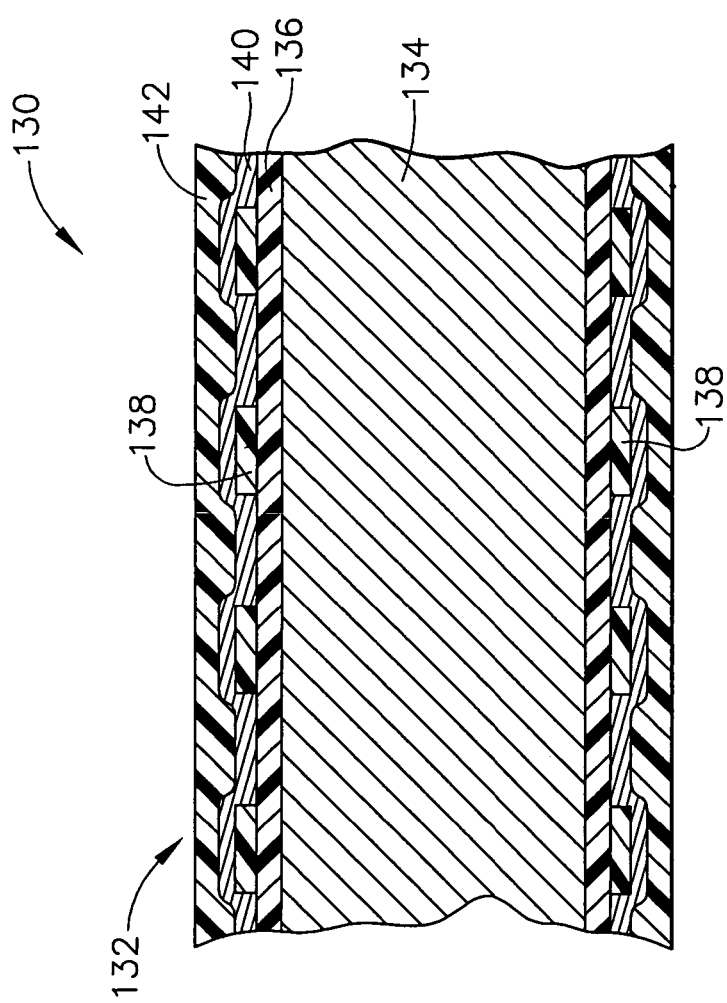

FIG. 13 is a side cross-sectional view of a heater system comprising a thick film layered heater directly formed on a transfer substrate with a target part disposed on the transfer substrate opposite the layered heater; and FIG. 14 is a side cross-sectional view, taken longitudinally along a resistive layer trace, illustrating insulative pads in accordance with the teachings of the present disclosure.

Corresponding reference numerals indicate corresponding parts throughout the several views of the drawings.

DETAILED DESCRIPTION

The following description of the present disclosure is merely exemplary in nature and is in no way intended to limit the disclosure, its application, or uses.

Figure 1A:
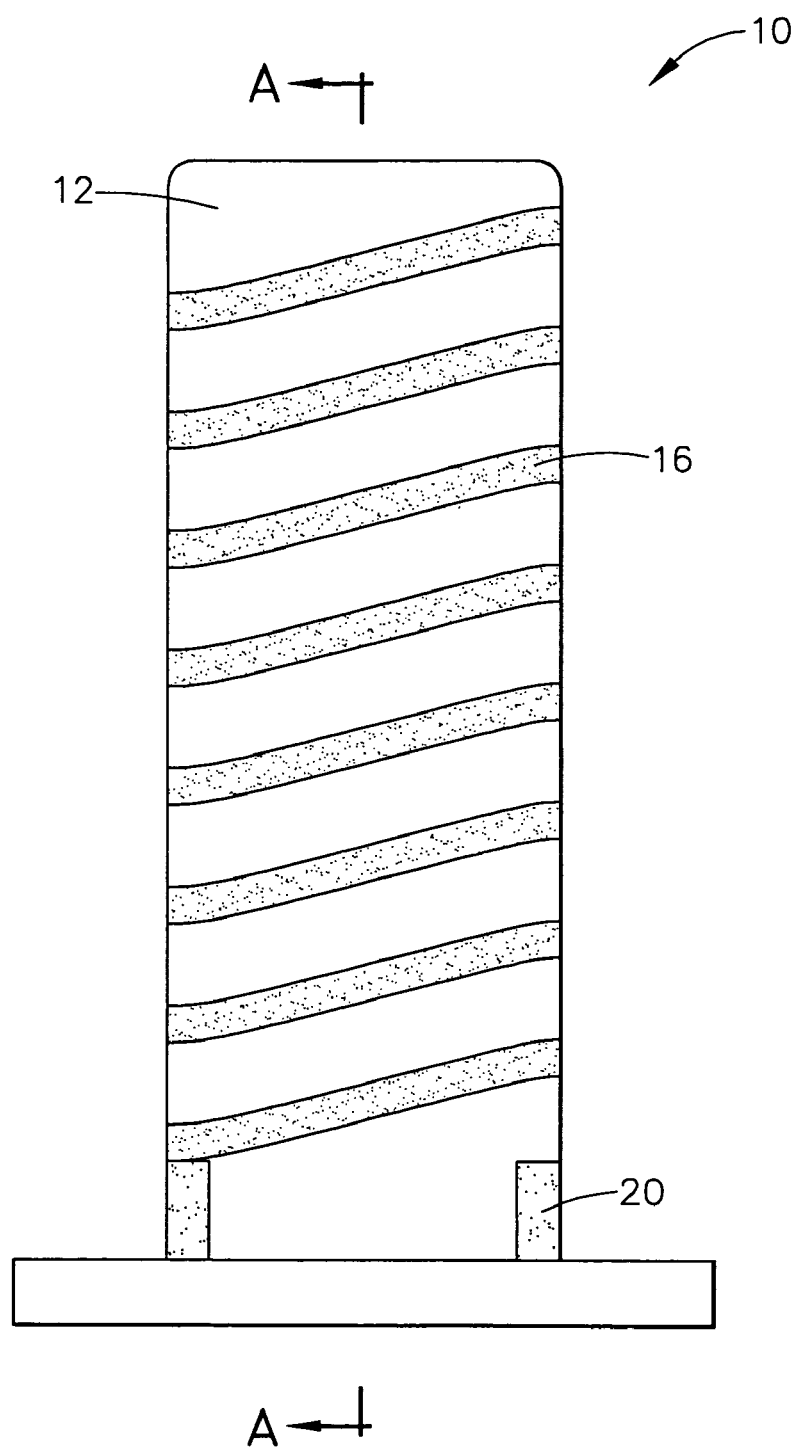
FIG. 1a is a side view of layered heater constructed in accordance with the principles of the present disclosure.
Figure 1B:
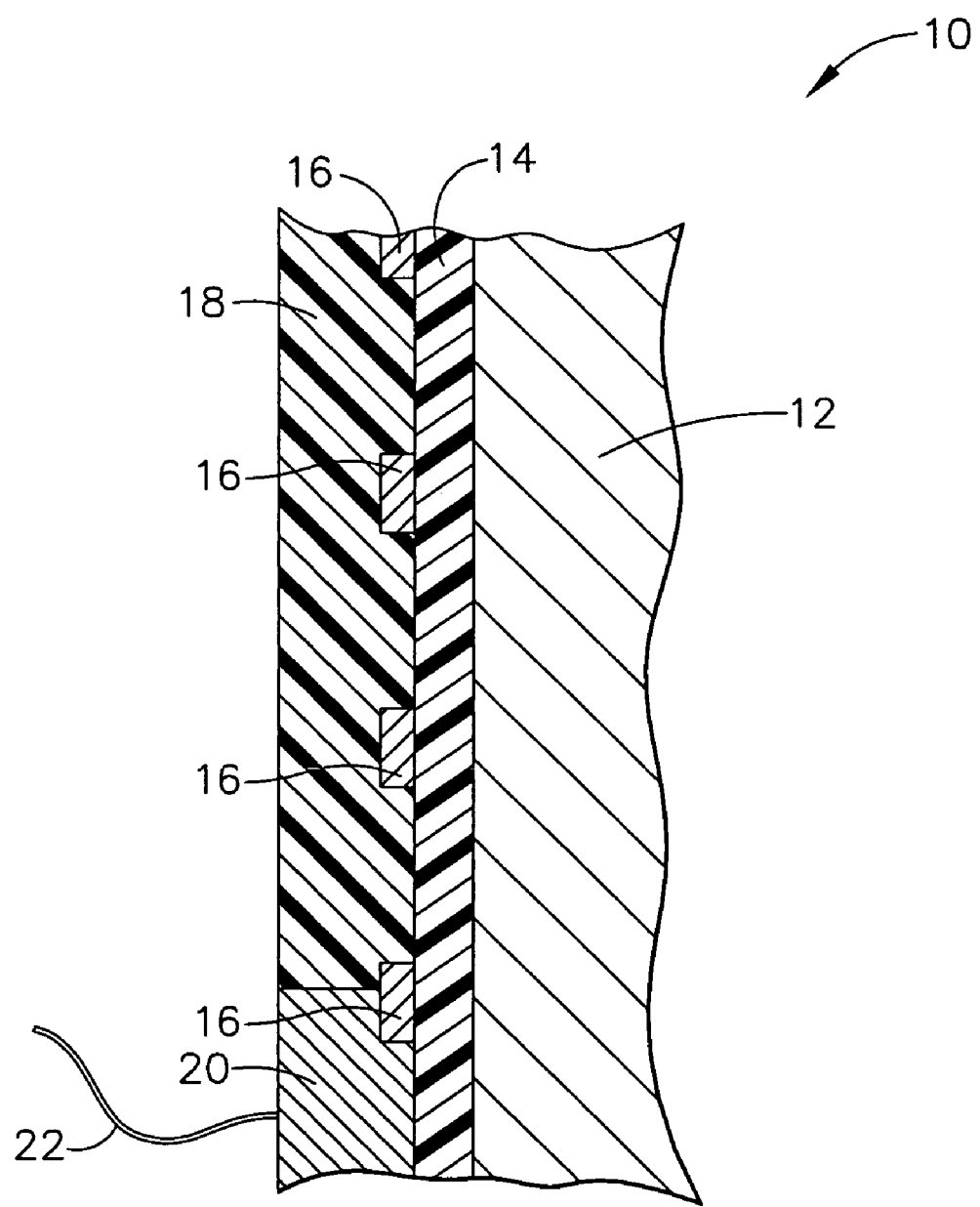
FIG. 1b is an enlarged partial cross-sectional side view, taken along line A-A of FIG. 1a, of a layered heater constructed in accordance with the principles of the present disclosure.

Referring to FIGS. 1a and 1b, a layered heater system in accordance with the present disclosure is preferably employed with a layered heater, which is illustrated and generally indicated by reference numeral 10. The layered heater 10 comprises a number of layers disposed on a substrate 12, wherein the substrate 12 may be a separate element disposed proximate the part or device to be heated, or the substrate 12 may be the part or device itself. As best shown in FIG. 1b, the layers preferably comprise a dielectric layer 14, a resistive layer 16, and a protective layer 18. The dielectric layer 14 provides electrical isolation between the substrate 12 and the resistive layer 16 and is formed on the substrate 12 in a thickness commensurate with the power output, applied voltage, intended application temperature, or combinations thereof, of the layered heater 10. The resistive layer 16 is formed on the dielectric layer 14 and provides a heater circuit for the layered heater 10, thereby providing the heat to the substrate 12. The protective layer 18 is formed on the resistive layer 16 and is preferably an insulator, however other materials such as an electrically or thermally conductive material may also be employed according to the requirements of a specific heating application while remaining within the scope of the present disclosure.

As further shown, terminal pads 20 are preferably disposed on the dielectric layer 14 and are in contact with the resistive layer 16. Accordingly, electrical leads 22 are in contact with the terminal pads 20 and connect the resistive layer 16 to a power source (not shown). (Only one terminal pad 20 and one electrical lead 22 are shown for clarity, and it should be understood that two terminal pads 20 with one electrical lead 22 per terminal pad 20 is the preferred form of the present disclosure). The terminal pads 20 are not required to be in contact with the dielectric layer 14 and thus the illustration of the embodiment in FIG. 1 is not intended to limit the scope of the present disclosure, so long as the terminal pads 20 are electrically connected to the resistive layer 16 in some form. As further shown, the protective layer 18 is formed on the resistive layer 16 and is preferably a dielectric material for electrical isolation and protection of the resistive layer 16 from the operating environment. Additionally, the protective layer 18 may cover a portion of the terminal pads 20 as shown so long as there remains sufficient area to promote an electrical connection with the power source.

As used herein, the term "layered heater" should be construed to include heaters that comprise at least one functional layer (e.g., dielectric layer 14, resistive layer 16, and protective layer 18, among others), wherein the layer is formed through application or accumulation of a material to a substrate or another layer using processes associated with thick film, thin film, thermal spraying, or sol-gel, among others. These processes are also referred to as "layered processes," "layering processes," or "layered heater processes." Such processes and functional layers are described in greater detail in co-pending application titled "Combined Layering Technologies for Electric Heaters," filed on Jan. 6, 2004, which is commonly assigned with the present application and the contents of which are incorporated herein by reference in their entirety.

Figure 2B:
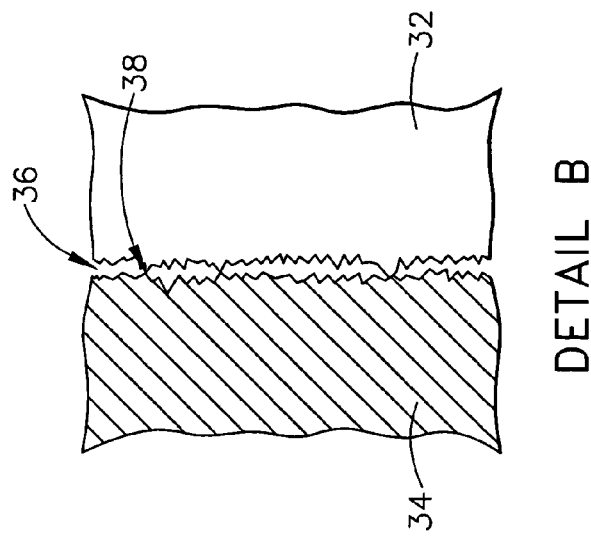
FIG. 2b is a detail view, taken along detail B of FIG. 2a, of an air gap and inconsistent heat transfer paths between a layered heater and a hot runner nozzle according to a prior art heater system.
Figure 2A:
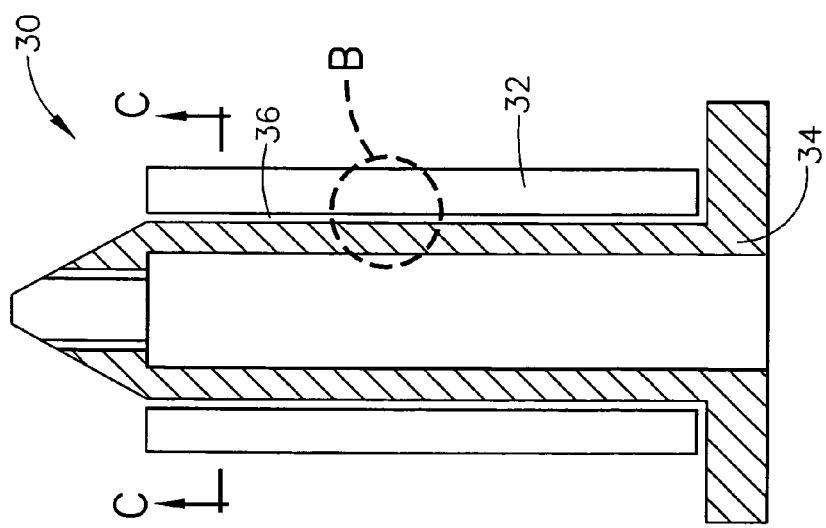
FIG. 2a is a side cross-sectional view of a layered heater disposed around a hot runner nozzle according to a prior art heater system.

Referring now to FIG. 2a, a prior art heater system 30 is illustrated, which comprises a layered heater 32 disposed around a hot runner nozzle 34 of an injection molding system. The layered heater 32 is generally appropriately sized to enable a "slip-fit," or an interference fit, over the hot runner nozzle 34, wherein the layered heater 32 is slid with a relatively low physical resistance over the hot runner nozzle 34 at ambient or room temperature for assembly. Unfortunately, this "slip-fit" results in an air gap 36 between the layered heater 32 and the hot runner nozzle 34, which reduces the heat transfer characteristics between the layered heater 32 and the hot runner nozzle 34. In addition, this type of fit makes the heat transfer characteristics of the heating system 30 difficult to repeat and reproduce from part to part and from batch to batch. The presence of the air gap 36 and the resultant loss in heat transfer causes a slower response of the layered heater system 30, which negatively impacts the performance of the heater system 30. As shown in greater detail in FIG. 2b, even if the fit between the layered heater 32 and the hot runner nozzle 34 were relatively close, air gaps 36 still remain and only intermittent conductive heat transfer at locations 38 are present. Therefore, air gaps 36 are undesirable in such heater systems due to the degradation of heat transfer. Additionally, as shown in FIG. 2c, the clearance fit often results in non-concentric positioning of the layered heater 32 relative to the hot runner nozzle 34. This non-concentric fit produces even more pronounced air gaps 36, which further degrade the performance of the heater system 30.

Figure 3D:
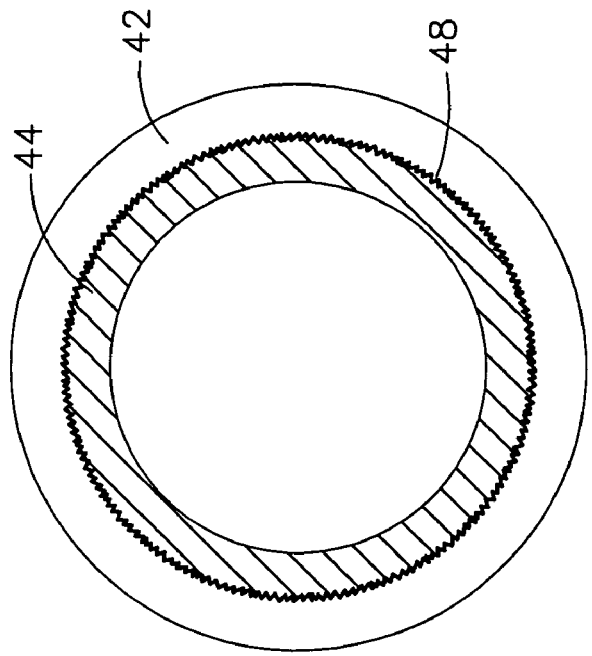
FIG. 3d is a cross-sectional view, taken along line E-E of FIG. 3c, of a concentric fit between a layered heater and a target part in accordance with the principles of the present disclosure.
Figure 3C:
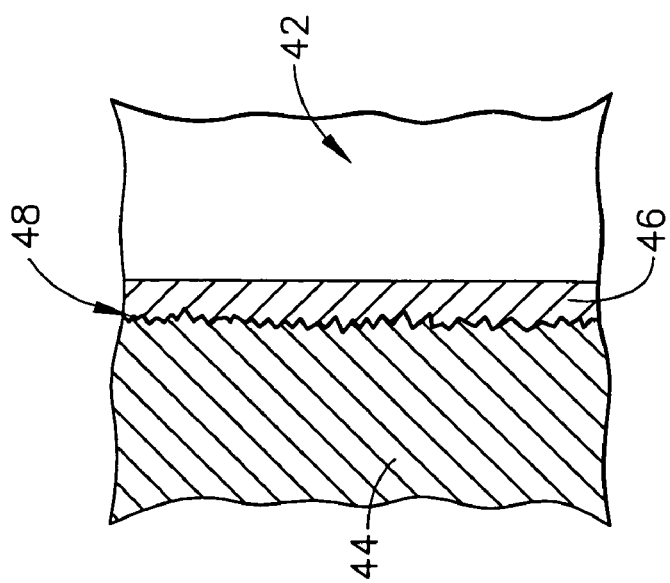
FIG. 3c is a detail view, taken along detail D of FIG. 3b, of an interference fit between a layered heater and a target part in accordance with the principles of the present disclosure.

Accordingly, a heater system 40 as shown in FIGS. 3a-3c is provided by the present disclosure in order to improve the heat transfer between a layered heater 42 (not all layers are shown for purposes of clarity) and a part that is to be heated, which is hereinafter referred to as a target part 44. As shown, both the layered heater 42 and the target part 44 are preferably cylindrical, although other shapes are contemplated by the present disclosure as described in greater detail below. The layered heater 42 comprises a substrate 46 that defines a room temperature inner diameter D1 that is less than or equal to a room temperature outer diameter D2 of the target part 44. The room temperature inner diameter D1 may be sized to be equal to D2 in the application of a line-to-line fit of the layered heater 42 to the target part 44. Therefore, the layered heater 42 is assembled with the target part 44 using either mechanical or thermal methods in order to create an interference fit 48 as best shown in FIGS. 3b and 3c. The interference fit 48 thus results in improved heat transfer between the layered heater 42 and the target part 44, thereby improving the response of the layered heater 42.

Moreover, as shown in FIG. 3d, a concentric fit between the layered heater 42 and the target part 44 is produced as a result of the interference fit 48. As the layered heater 42 is thermally or mechanically formed around the target part 44, as described in greater detail below, the outer diameter of the target part 44 conforms to the inner diameter of the layered heater 42, which positions the layered heater 42 and the target part 44 concentrically as shown. This concentric fit further reduces the air gaps, provides more uniform heat transfer, and thus improves the response of the layered heater 42.

The preferred mechanical methods to create the interference fit 48 include a press or a drive process, although other processes known in the art may also be employed while remaining within the scope of the present disclosure. The thermal methods may include, but are not limited to, cooling and/or heating the target part 44 and/or the layered heater 42. For example, the target part 44 may be cooled while the layered heater 42 remains at room temperature, thereby reducing the room temperature outer diameter D2 such that the target part 44 may be positioned within the layered heater 42. Upon return to room temperature, the target part 44 expands back towards the room temperature outer diameter D2 to create the interference fit 48. Alternately, the layered heater 42 may be heated while the target part 44 is cooled, or the layered heater 42 may be heated while the target part 44 remains at room temperature.

Figure 4B:
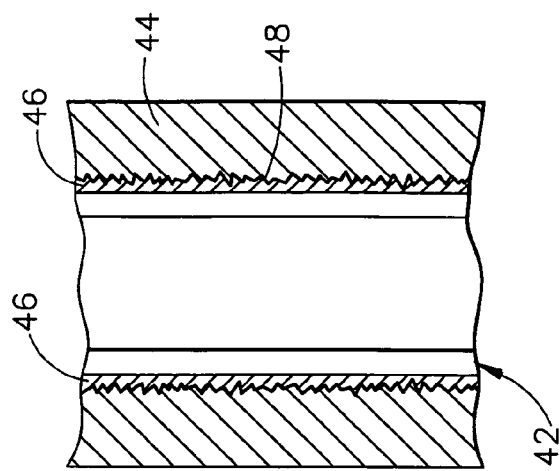
FIG. 4b is a side cross-sectional view of a layered heater disposed within a target part in accordance with the principles of the present disclosure.
Figure 4A:
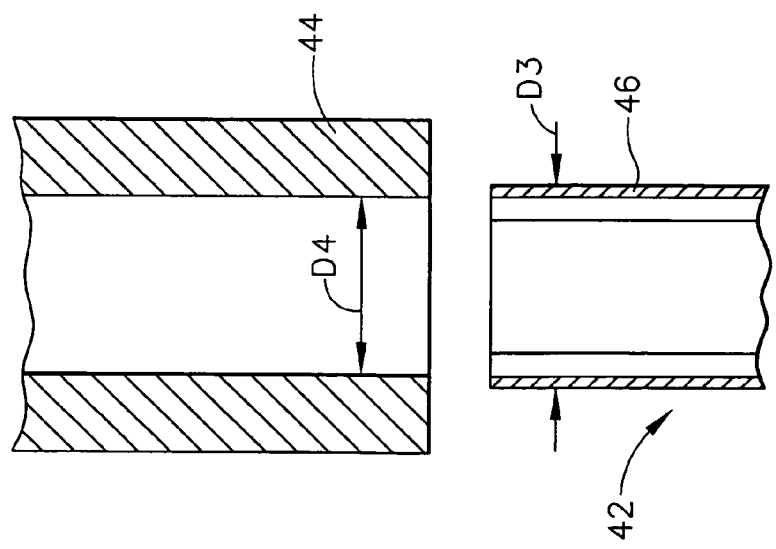
FIG. 4a is a side cross-sectional view of a layered heater and a target part constructed in accordance with the principles of the present disclosure.
Figure 5A:
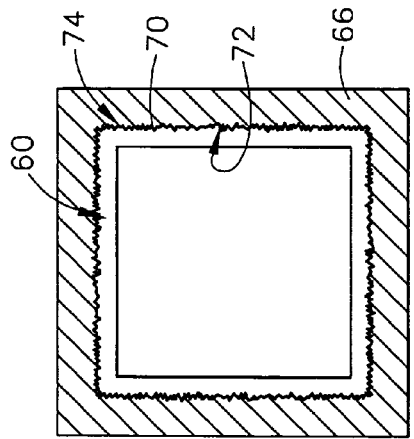
FIG. 5a is a side cross-sectional view of a square layered heater disposed around a square target part in accordance with the principles of the present disclosure.
Figure 5B:
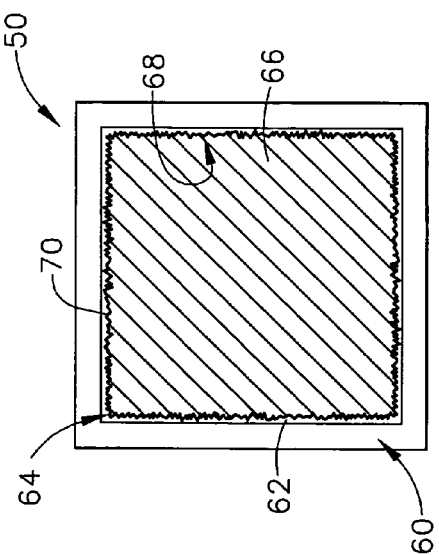
FIG. 5b is a side cross-sectional view of a square layered heater disposed within a square target part in accordance with the principles of the present disclosure.

As shown in FIGS. 4a and 4b, the layered heater 42 is alternately positioned within the target part 44 rather than around the target part as previously illustrated. Accordingly, the layered heater 42 comprises a room temperature outer diameter D3, and the target part 44 defines a room temperature inner diameter D4 such that upon application of a mechanical or thermal process as previously described, the interference fit 48 is formed between the layered heater 42 and the target part 44.

Figure 6:
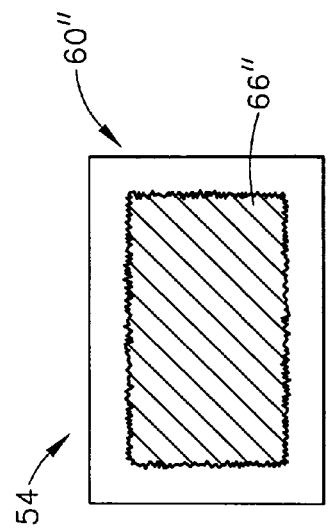
FIG. 6 is a side cross-sectional view of an oval layered heater disposed around an oval target part in accordance with the principles of the present disclosure.
Figure 7:
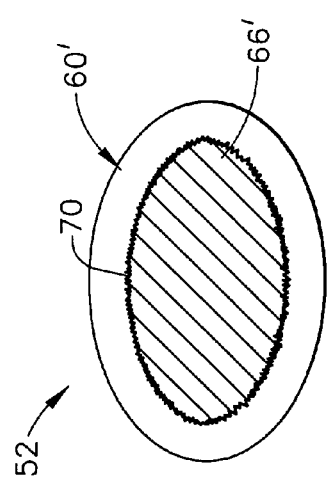
FIG. 7 is a side cross-sectional view of a rectangular layered heater disposed around a rectangular target part in accordance with the principles of the present disclosure.

Referring to FIGS. 5 through 8, the layered heater 42 and the target part 44 need not necessarily be cylindrical in shape, and other shapes are also contemplated within the scope of the present disclosure wherein the interference fit 48 is created between a layered heater and a target part. These shapes may include, by way of example, a square shape 50 as shown in FIGS. 5a and 5b, an oval shape 52 as shown in FIG. 6, a rectangular shape 54 as shown in FIG. 7, or a curved shape 56 as shown in FIG. 8, or combinations thereof. Accordingly, as shown for example in FIG. 5a, a layered heater 60 comprises a substrate 62 defining a room temperature inner periphery 64, and a target part 66 defines a room temperature outer periphery 68, wherein the room temperature inner periphery 64 of the layered heater 60 is less than or equal to the room temperature outer periphery 68 of the target part 66. As a result of the mechanical or thermal processes as previously described, an interference fit 70 is created between the layered heater 60 and the target part 66, thereby improving the heat transfer characteristics between the layered heater 60 and the target part 66. Alternately, as shown in FIG. 5b, the layered heater 60 may be disposed within the target part 66 rather than outside the target part 66 as shown in FIG. 5a, wherein a room temperature outer periphery 72 of the layered heater 60 is greater than or equal to a room temperature inner periphery 74 of the target part 66. Although layered heaters 60' and 60'' are shown disposed around target parts 66' and 66'', respectively, in FIGS. 6 and 7, and layered heater 60''' within the target part 66''' in FIG. 8, the layered heaters may either be disposed around or within these target parts as specific applications dictate while remaining within the scope of the present disclosure. It should be understood that the shapes and configurations as shown and described herein are exemplary and should not be construed as limiting the scope of the present disclosure to only those shapes and configurations.

Referring now to FIG. 9, the present disclosure further contemplates geometry that comprises a non-constant cross-section as shown with a layered heater 76 disposed around a target part 78 in a tapered configuration. Generally, the target part 78 and the layered heater 76 are brought into engagement and the tapered configuration facilitates both concentricity and the interference fit for improved heat transfer. As a result of the tapered configurations, the layered heater 76 and the target part 78 may be assembled and disassembled with greater ease over the alternate forms having a constant cross-section as previously described. More specifically, only a relatively small linear displacement of the layered heater 76 with respect to the target part 78 is required to engage and disengage the layered heater 76 and the target part 78 due to the tapered configuration. An interference fit 79 therefore results between the layered heater 76 an the target part 78 using a mechanical self-locking taper in one form of the present disclosure. Additionally, thermal methods as previously described may also be employed to produce the interference fit 79. Moreover, the layered heater 76 may alternately be disposed within the target part 78 while remaining within the scope of the present disclosure.

Figure 10A:
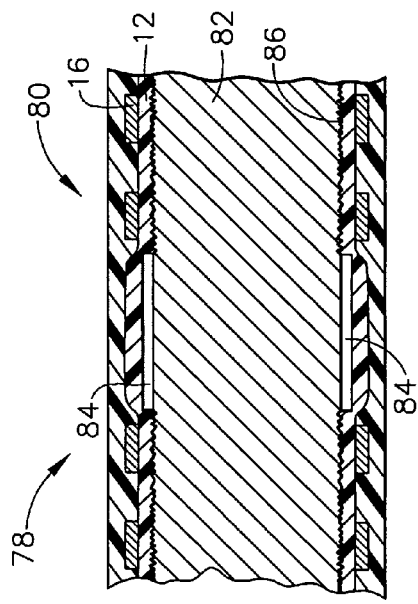
FIG. 10a is a side cross-sectional view of a recess created on an outer surface of a target part of a heater system and constructed in accordance with the principles of the present disclosure.

In another form of the present disclosure as shown in FIGS. 10a-10d, a tailored heat transfer system 78 is provided by the present disclosure that includes both high heat transfer characteristics with the interference fit as previously described, in addition to impeded, or selectively restricted, heat transfer characteristics along the length of the heater system 78, thereby resulting in tailored heat transfer characteristics. More specifically, as shown in FIG. 10a, a layered heater 80 is disposed around a target part 82, wherein a recess 84 is disposed therebetween. The recess 84 provides for local restricted heat transfer characteristics along the length of the layered heater 80 in applications where such tailored control may be required. Additionally, although only one recess 84 is illustrated herein, it should be understood that a plurality of recesses may also be employed while remaining within the scope of the present disclosure. Therefore, the tailored heat transfer system 78 comprises at least one recess 84 in accordance with the teachings of the present disclosure.

As further shown, the resistive layer 16 may also be altered along the length of the layered heater 80 to provide additional tailoring of the heat transfer characteristics, in addition to the tailoring provided by the recess 84. The illustration of the resistive layer 16 is thus exemplary and should not be construed as limiting the scope of the present disclosure. Additionally, an interference fit 86 is created between the layered heater 80 and the target part 82 as previously described, thereby creating improved heat transfer characteristics between the layered heater 80 and the target part 82 in those areas. The recess 84 as shown in FIG. 10a is an outer surface recess within the target part 82, however, other forms of creating the recess 84 and multiple recesses and alternate locations are shown in FIGS. 10b-10c.

Figure 10B:
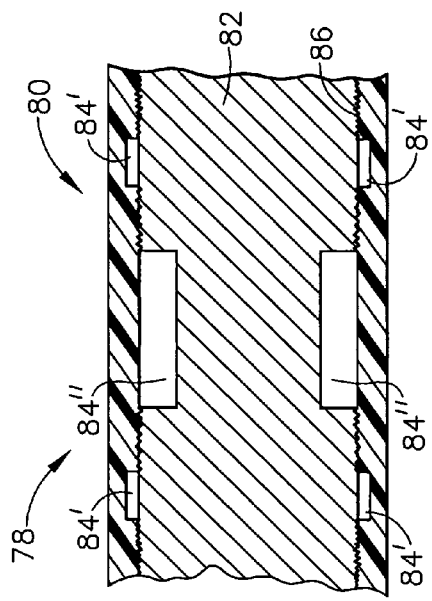
FIG. 10b is a side cross-sectional view of a recess created on an inner surface of a layered heater of a heater system and constructed in accordance with the principles of the present disclosure.

As shown in FIG. 10b, the recess 84 is an inner surface recess within the substrate 12 of the layered heater 80. Both an inner surface recess within the layered heater 80 and an outer surface recess within the target part 82 are shown in FIG. 10c to create the recess 84. Alternately, both inner surface recesses 84' within the layered heater 80 and an outer surface recess 84" within the target part 82 are shown in FIG. 10d, wherein multiple recesses in alternate locations along the length of the heater system 78 are provided. It should be understood that the layered heaters 80 may alternately be disposed within the target parts 82 and may also take on alternate shapes as previously illustrated while remaining within the scope of the present disclosure.

Figure 10C:
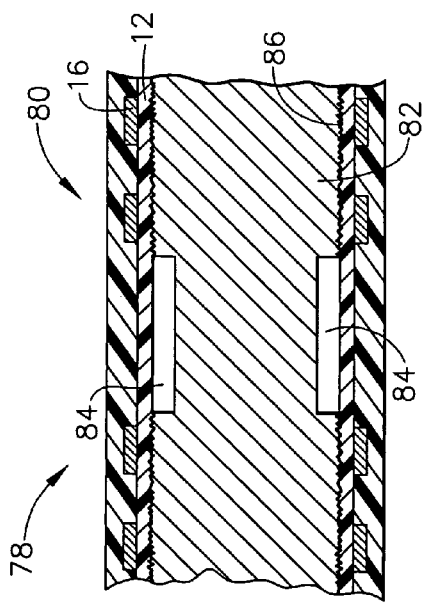
FIG. 10c is a side cross-sectional view of a recess created on an outer surface of a target part and on an inner surface of a layered heater of a heater system, and further of a filler material and a discrete component within the recess, in accordance with the principles of the present disclosure.
Figure 10D:
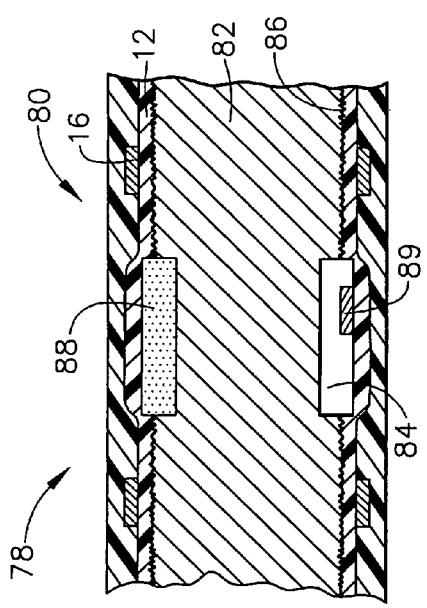
FIG. 10d is a side cross-sectional view of recesses created on an outer surface of a target part and on an inner surface of a layered heater of a heater system and constructed in accordance with the principles of the present disclosure.

As further shown in FIG. 10c by way of example, the tailored heat transfer system 78 in another form comprises a filler material 88 disposed within the recess 84 for altering the heat transfer properties proximate the recess 84. The filler material 88 may be insulative or conductive for either lower or higher heat transfer characteristics as desired. For example, in one form the filler material 88 may be a liquid metal for higher heat transfer or a salt or Sauereisen® cement for lower heat transfer. In yet another form, the tailored heat transfer system 78 comprises a discrete component 89 disposed within the recess 84 to perform certain functions that may be desired. For example, the discrete component 89 may be a thermocouple for temperature sensing local to a desired area. Additional discrete components may include, but are not limited to, RTDs (Resistance Temperature Detectors), thermistors, strain gauges, thermal fuses, optical fibers, and microprocessors and controllers, among others. Therefore, the heat transfer system 78 provides improved heat transfer characteristics, impeded heat transfer characteristics, and discrete functional capabilities according to the teachings of the present disclosure.

Figure 11:
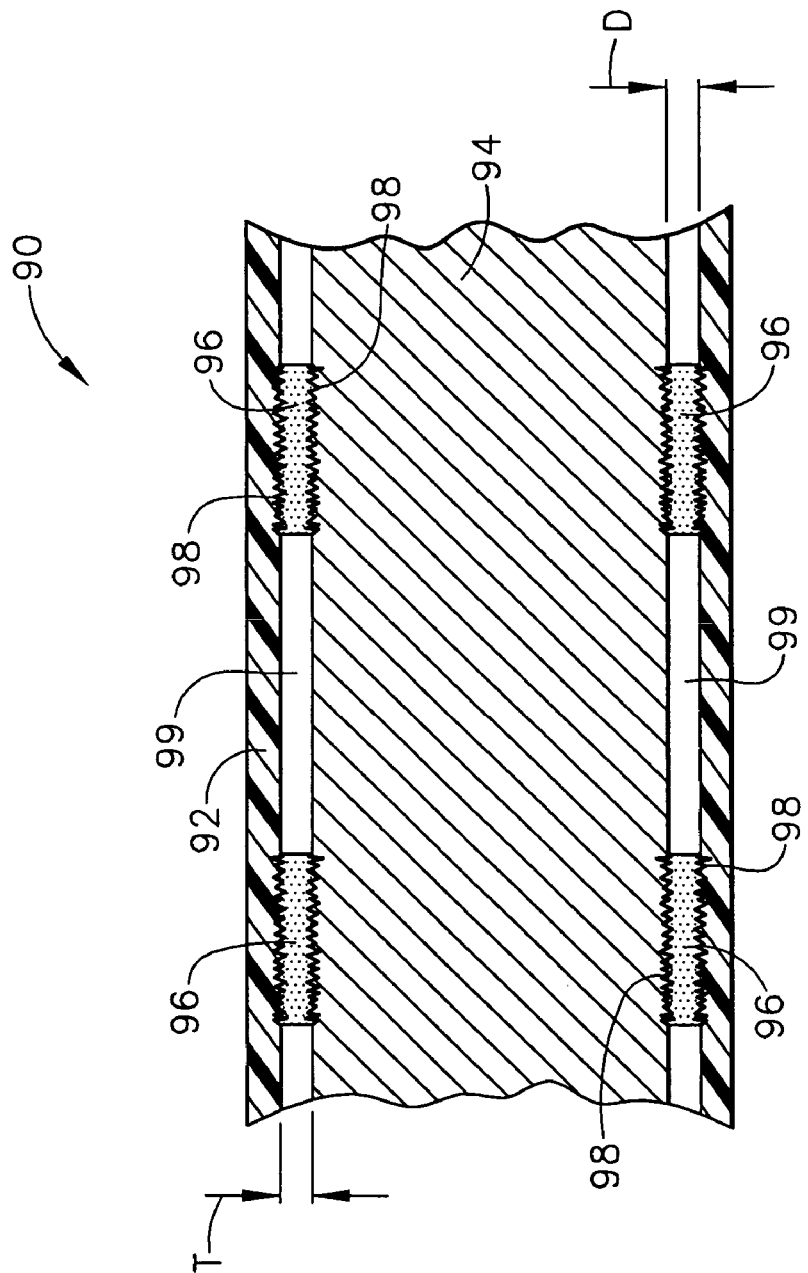
FIG. 11 is a side cross-sectional view of a heater system comprising thermal spacers disposed between a target part and a layered heater.

Referring to FIG. 11, yet another form of the present disclosure that provides tailored heat transfer via selectively improved and/or impeded heat transfer is illustrated as heater system 90. The heater system 90 comprises a layered heater 92 disposed proximate a target part 94, wherein a plurality of thermal spacers 96 are disposed between the layered heater 92 and the target part 94. As a result, a plurality of tailored heat transfer regions 98 and 99 are formed for tailored heat transfer. Heat transfer region 98 is illustrated between the thermal spacers 96 and the layered heater 92 and target part 94, and the heat transfer region 99 is illustrated between the layered heater 92 and the target part 94. The heat transfer regions 98 and 99 may thus be tailored for improved and/or impeded heat transfer, wherein for example, if the thermal spacers 96 were conductive, heat transfer region 98 would provide improved heat transfer and heat transfer region 99 would provide impeded heat transfer.

Preferably, the thermal spacers 96 have a coefficient of thermal expansion (CTE) greater than that of the layered heater 92, more specifically the substrate of the layered heater which is not shown herein for clarity, and the target part 94. Accordingly, the thermal spacers 96 expand during operation to create a high heat transfer fit 98 between the layered heater 92 and the target part 94 proximate the thermal spacers 96. In one form, the thermal spacers 96 are an aluminum material, however, other materials may also be employed while remaining within the scope of the present disclosure.

Alternately, an interference fit as previously described may be employed with the heater system 90, wherein mechanical or thermal processes are employed to create the interference fit and thus provide for improved heat transfer characteristics in desired areas. For example, the thermal spacers 96 would define a room temperature thickness T that is greater than or equal to the room temperature distance D between the layered heater 92 and the target part 94. The thermal spacers 96 may be formed on the target part 94 using processes such as thermal spraying, or the thermal spacers 96 may alternately be formed on the layered heater 92 also using the process of thermal spraying. It should be understood that other processes may also be employed to form the thermal spacers 96 while remaining within the scope of the present disclosure. Therefore, the heater system 90 provides improved heat transfer characteristics and impeded heat transfer characteristics according to the teachings of the present disclosure.

Figure 12B:
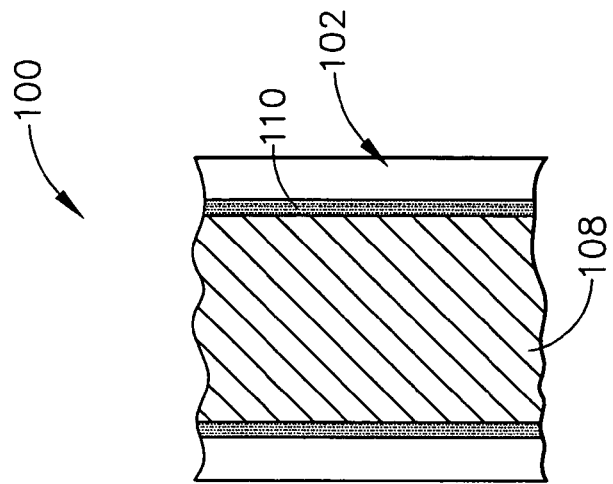
FIG. 12b is a side cross-sectional view of a heater system having a high heat transfer fit between a layered heater and a target part in accordance with the principles of the present disclosure.
Figure 12A:
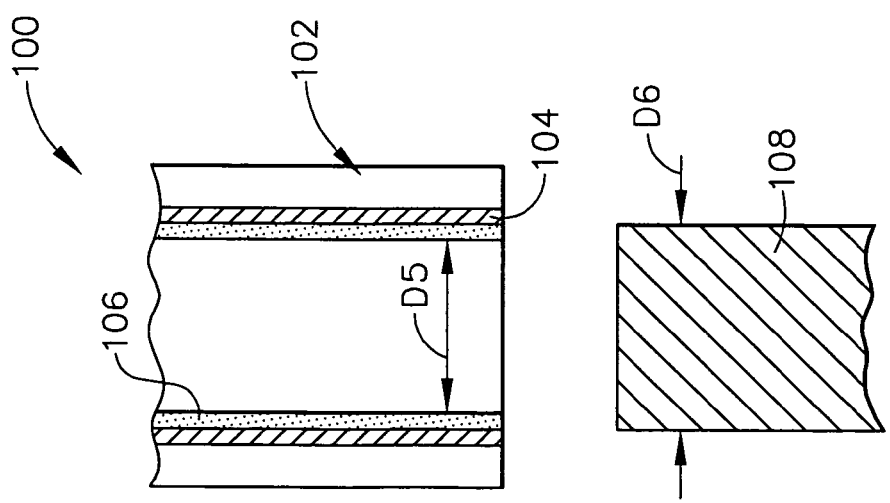
FIG. 12a is a side cross-sectional view of a heater system comprising a layered heater having a pre-coat and a target part in accordance with the principles of the present disclosure.

Yet another form of the present disclosure is illustrated in FIGS. 12a and 12b, wherein a heater system 100 comprises a layered heater 102 comprising a substrate 104 with a pre-coated surface 106. The pre-coated surface 106 is preferably coated with a brazing material, however, other materials may also be employed while remaining within the scope of the present disclosure. As shown, an inner diameter D5 of the layered heater 102 is less than or equal to an outer diameter D6 of a target part 108. Therefore, either the mechanical or thermal processes may be employed as previously described in order to create a high heat transfer fit 110 between the layered heater 102 and the target part 108. Additionally, the layered heater may be disposed inside the target part and other shapes may be employed as previously described while remaining within the scope of the present disclosure. Other variations of treating the layered heater 102 and/or the target part 108 in order to create a high heat transfer fit shall be construed as falling within the scope of the present disclosure. These variations may include, by way of example, direct welding (e.g., friction stir welding), among others.

Referring now to FIG. 13, another form of the present disclosure that provides improved heat transfer is illustrated and shown as heater system 120. In this form, a thick film layered heater 122 is formed directly on a heated surface 124 of a heat transfer substrate 126. A target part 128 that is formed of a material which is directly incompatible with the thick film layered heater 122 is disposed on the heat transfer substrate 126 as shown, opposite the thick film layered heater 122. Accordingly, the heat transfer substrate 126 transfers heat from the thick film layered heater 122 to the target part 128 and thus a thick film layered heater 122 may be employed with a previously incompatible target part 128. "Directly incompatible" as used herein is directed to the combination of a thick film layered heater and a target part, wherein the difference in CTE between the thick film layered heater and the target part is relatively large such that this large CTE difference would cause degradation in the structural integrity of the thick film heater. Additionally, the high firing temperatures of the thick film layered heater would be too high for the target part that consists of a material incapable of withstanding heater layer processing temperatures. Moreover, the high firing temperatures of the thick film layered heater may alter material properties of the target part, for example, where the target part comprises a heat treated surface that would be altered during firing. Therefore, "directly incompatible" means a large CTE difference between the thick film layered heater and the target part, a target part that is incapable of withstanding the high firing temperatures of the thick film layered heater, and/or a target part comprising a material that would be altered during firing.

Additionally, the target part 128 may be disposed outside the heat transfer substrate 126 and the layered heater 122 disposed within the heat transfer substrate 126, as previously illustrated, while remaining within the scope of the present disclosure. Further, an interference fit between the heat transfer substrate 126 and the target part 128 may also be formed as described herein without departing from the spirit and scope of the present disclosures. Moreover, alternate shapes may be employed, as previously illustrated, according to specific application requirements without departing from the teachings of the present disclosure.

As shown in FIG. 14, another form of the present disclosure that provides tailored heat transfer characteristics is shown and illustrated as a heater system 130. The heater system 130 comprises a layered heater 132 disposed around a target part 134, although the layered heater 132 could alternately be disposed within the target part 134. The layered heater 132 further comprises a dielectric layer 136, which shown formed directly on the target part 134, however, the dielectric layer 136 may alternately be formed on a substrate with an interference fit between the substrate and the target part 134 as previously described. As further shown, a plurality of insulative pads 138 are formed on the dielectric layer 136, and a resistive layer 140 is formed over the insulative pads 138, followed by a protective layer 142 formed over the resistive layer 140. The insulative pads 138 are disposed between the resistive layer 140 and the target part 134 to reduce the rate of heat transfer from the resistive layer 140 to the target part 134 as required. Alternately, the insulative pads 138 may be disposed between the resistive layer 140 and the protective layer 142 to reduce the rate of heat transfer to the surrounding environment. Therefore, the insulative pads 138 are employed to further tailor the heat transfer characteristics along the layered heater 132.

The description of the disclosure is merely exemplary in nature and, thus, variations that do not depart from the gist of the disclosure are intended to be within the scope of the disclosure. The layered heaters as shown and described herein may be disposed within or around the target part, various geometric configurations may be employed, and the elements for tailored heat transfer may be employed at various locations throughout the layered heater system. Additionally, the heater systems as described herein may be employed with a two-wire controller as shown and described in co-pending application Ser. No. 10/719,327, titled "Two-Wire Layered Heater System," filed Nov. 21, 2003, and in co-pending application titled "Combined Material Layering Technologies for Electric Heaters," filed Jan. 6, 2004, both of which are commonly assigned with the present application and the contents of which are incorporated herein by reference in their entirety. Such variations are not to be regarded as a departure from the spirit and scope of the disclosure.

What is claimed is:

1. A method of assembling a heater system comprising the steps of:
    (a) forming a dielectric layer as a part of a layered heater;
    (b) forming a plurality of insulative pads on the dielectric layer;
    (c) forming a resistive layer over the insulative pads;
    (d) thermally treating at least one of a target part defining a room temperature outer periphery and the layered heater comprising a substrate defining a room temperature inner periphery such that the respective periphery is dimensionally altered;
    (e) positioning the target part within the layered heater; and
    (f) bringing at least one of the target part and the layered heater to room temperature, thereby causing an interference fit between the layered heater and the target part to produce in a concentric fit between the layered heater and the target part.

2. The method according to claim 1 wherein the thermally treating comprises cooling the target part.

3. The method according to claim 1 wherein the thermally treating comprises cooling the target part and heating the layered heater.

4. The method according to claim 1 wherein the thermally treating comprises heating the layered heater.

5. The method according to claim 1 further comprising forming a protective layer over the resistive layer.

6. A method of assembling a heater system comprising the steps of:
    (a) forming a dielectric layer as a part of a layered heater;
    (b) forming a plurality of insulative pads on the dielectric layer;
    (c) forming a resistive layer over the insulative pads;
    (d) thermally treating at least one of a target part defining a room temperature inner periphery and the layered heater defining a room temperature outer periphery such that the respective periphery is dimensionally altered;

(e) positioning the target part around the layered heater; and (f) bringing at least one of the target part and the layered heater to room temperature, thereby causing an interference fit between the layered heater and the target part to produce in a concentric fit between the layered heater and the target part.

7. The method according to claim 6 further comprising forming a protective layer over the resistive layer.

8. The method according to claim 6 wherein the thermally treating comprises cooling the layered heater.

9. The method according to claim 6 wherein the thermally treating comprises cooling the layered heater and heating the target part.

10. The method according to claim 6 wherein the thermally treating comprises heating the target part.

11. A method of assembling a heater system comprising the steps of:
   (a) coating at least one surface of a target part or a layered heater with a pre-coat;
   (b) thermally treating at least one of the target part defining a room temperature outer periphery and the layered heater comprising a substrate defining a room temperature inner periphery such that the respective periphery is dimensionally altered;
   (c) positioning the target part within the layered heater; and
   (d) bringing at least one of the target part and the layered heater to room temperature, thereby causing an interference fit between the layered heater and the target part to produce in a concentric fit between the layered heater and the target part.

12. The method according to claim 11, wherein the pre-coat is a brazing material.

13. A method of assembling a heater system comprising the steps of:
   (a) coating at least one surface of a target part or a layered heater with a pre-coat;
   (b) thermally treating at least one of the target part defining a room temperature inner periphery and the layered heater defining a room temperature outer periphery such that the respective periphery is dimensionally altered;
   (c) positioning the target part around the layered heater; and
   (d) bringing at least one of the target part and the layered heater to room temperature, thereby causing an interference fit between the layered heater and the target part to produce in a concentric fit between the layered heater and the target part.

14. The method according to claim 13, wherein the pre-coat is a brazing material.

* * * * *